United States Patent [19]

Monson

[11] 4,291,493
[45] Sep. 29, 1981

[54] APPARATUS FOR SPROUTING SEEDS

[76] Inventor: Eugene Monson, 234 Randolph Dr., Apt. 203D, Madison, Wis. 53717

[21] Appl. No.: 110,206

[22] Filed: Jan. 7, 1980

[51] Int. Cl.³ .............................................. A01C 1/00
[52] U.S. Cl. .......................................... 47/14; 47/84
[58] Field of Search ..................................... 47/59–61, 47/14–16, 84, 69

[56] References Cited

U.S. PATENT DOCUMENTS

| | | | |
|---|---|---|---|
| 2,720,725 | 10/1955 | Peerless | 47/14 |
| 3,704,545 | 12/1972 | van Reisen | 47/69 |
| 3,961,444 | 6/1976 | Skaife | 47/84 X |
| 3,965,614 | 6/1976 | Kienholz | 47/14 |
| 4,006,557 | 2/1977 | Sawyer | 47/61 |
| 4,124,953 | 11/1978 | Patton | 47/84 X |
| 4,135,331 | 1/1979 | Lamlee | 47/61 |
| 4,180,941 | 1/1980 | Korematsu | 47/14 |
| 4,236,353 | 12/1980 | Sorenson | 47/84 X |

Primary Examiner—Robert E. Bagwill
Attorney, Agent, or Firm—Isaksen, Lathrop, Esch, Hart & Clark

[57] ABSTRACT

A sprouting apparatus (10) is disclosed which is suitable for the merchandising of seeds to be sprouted, the actual sprouting of the seeds, and the storage of the resulting sprouts. The sprouting apparatus (10) includes an outer container (12) which receives therein an inner container (14) in which the seeds are actually sprouted. The assembly is covered by a dome member (16). Nesting structure (24, 28) is provided on the inner and outer containers (14 and 12) so that an air passage is maintained between the inner and outer containers (14 and 12) at all times.

8 Claims, 4 Drawing Figures

APPARATUS FOR SPROUTING SEEDS

TECHNICAL FIELD

The present invention relates to apparatus for sprouting seeds to form sprouts for human consumption. The present apparatus also relates to containers for packaging and merchandising seeds suitable for sprouting and also containers for storing sprouted seeds until such time as they are desired for consumption.

DESCRIPTION OF THE PRIOR ART

The prior art is generally cognizant of the concept of growing sprouts from seeds. In order for sprouts to be grown from seeds, it is necessary for the seeds to be provided with conditions such as to encourage the natural sprouting processes to commence. This is done by subjecting the seeds to suitable moisture and temperature conditions so as to encourage the natural sprouting of the seeds. Commonly this is accomplished by washing the seeds frequently or immersing them in water and then keeping them in a relatively high moisture environment while they are relatively warm so that the seeds will proceed to sprout. Often this is done in a common jar which is closed by a screen at one end with the seeds being periodically washed and drained so as to keep them moist.

The prior patent art is generally cognizant of apparatus specifically designed for sprouting seeds. U.S. Pat. Nos. 3,965,614, 4,006,557 and 4,135,331, as well as Design Pat. No. D242,267, are illustrative of the general attempts in the art to construct such sprouters suitable for use at home to raise sprouts for human consumption. Devices are also known in the art to be used for generating such sprouts which are more suitable for commercial applications. Examples of patents showing sprouters suitable for such applications are U.S. Pat. Nos. 2,600,718, 2,810,988, 3,328,912, 4,057,930 and 4,144,671. None of these prior art sprouters are suitable for use as a package in which the seeds to be sprouted in the sprouter may be merchandised and none is also completely suitable for use as a storage receptacle for the seeds once they are sprouted.

It is also generally known in the art that containers may be nested within each other. Examples of receptacles having specific structural features allowing the nesting of receptacles within one another are shown in U.S. Pat. Nos. 2,563,352, 3,489,267, 3,609,263 and 3,760,972.

SUMMARY OF THE INVENTION

The present invention is summarized in that an apparatus for sprouting seeds includes an outer container of a generally tubular shape provided with an interior nesting stop and also provided with a bottom at one end thereof; an inner container of a generally tubular shape provided with an interior and an exterior nesting stop and also provided with a bottom at one end thereof, the bottom of the inner container being perforated with a plurality of openings, the inner container being received within the outer container with the exterior nesting stop of the inner container engaging the interior nesting stop of the outer container so that the bottom of the inner container is spaced above the bottom of the outer container so that water may drain from the inner container to the outer container; and, a cup-shaped dome member provided with a rim around the edge thereof and arranged so as to be positioned over the other end of the inner container with the rim engaging the interior nesting stop of the inner container to form an enclosure in the inner container suitable for the sprouting of seeds.

It is an object of the present invention to provide an apparatus for sprouting seeds which is also usable as a complete merchandising package for the seeds to be sprouted.

It is yet another object of the present invention to provide an apparatus for sprouting seeds which is also usable for a storage device for storing the seeds once they are sprouted.

It is a further object of the present invention to provide an economical and simple sprouting system which may be easily used at home to generate sprouted seeds for human consumption and which is of an economical and disposable nature.

Other objects, advantages and features of the present invention will become apparent from the following specification when taken in conjunction with the accompanying drawing.

DESCRIPTION OF THE PREFERRED EMBODIMENT

Figure 1:
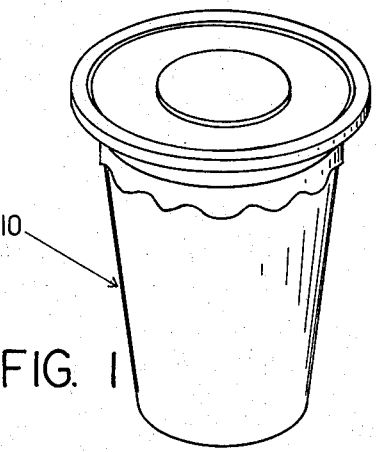
FIG. 1 is a perspective view of a sprouting apparatus constructed in accordance with the present invention.
Figure 2:
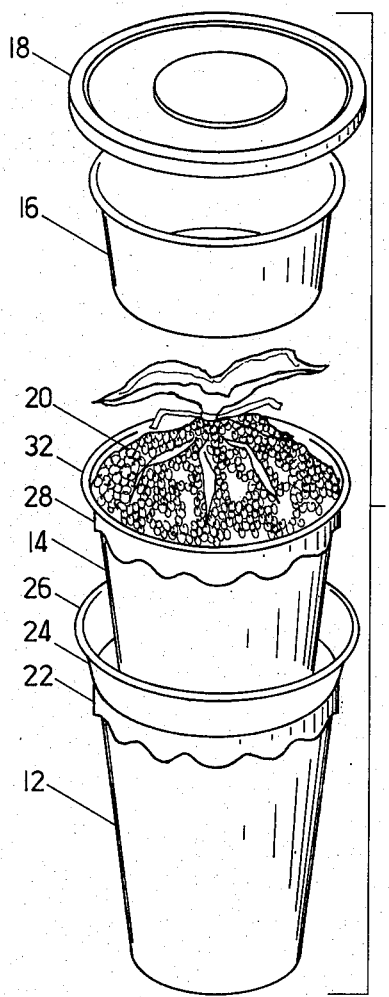
FIG. 2 is an exploded view of the sprouting apparatus of FIG. 1.

Shown in FIG. 1, and generally indicated at 10, is an apparatus for sprouting seeds constructed in accordance with the present invention. The apparatus of FIG. 1 is also shown in exploded view in FIG. 2, which illustrates the general structural component of the sprouting apparatus 10 of FIG. 1. The sprouting apparatus 10 as shown in FIGS. 1 and 2 includes an outer container 12 within which is received an inner container 14. Within the inner container 14, a cup-shaped dome member 16 is received while a disc-shaped cover 18 designed to interfit over the top of the outer container 12 covers the top of the sprouting apparatus 10. A supply of seeds 20 is provided within the sprouting apparatus 10 as it is merchandised by a commercial establishment. The supply of seeds 20 may be received within the inner container 14 underneath the dome member 16, as is illustrated in FIG. 2, or, alternatively may be positioned within the dome member 16 underneath the cover 18 of the sprouting apparatus 10.

Figure 3:
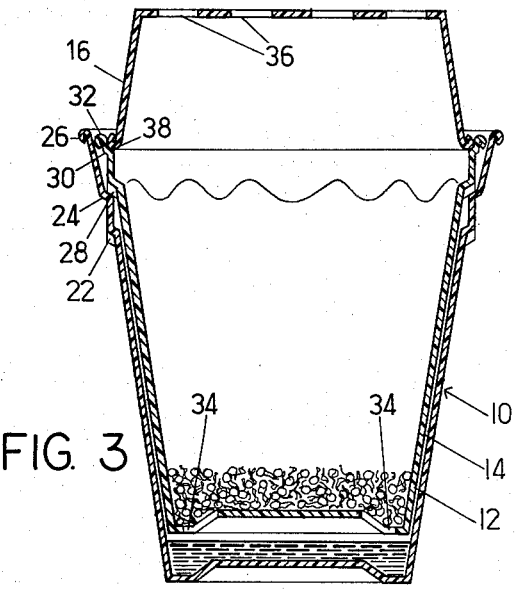
FIG. 3 is a cross-sectional view of the sprouting apparatus of FIG. 1 in its configuration for sprouting the seeds therein.

In general, the structural details of the various components of the sprouting apparatus 10 may be seen in more detail in FIGS. 2 and 3. Referring first to the outer container 12, it may be seen that the outer container 12 is of a generally tubular shape, which is meant to say in this instance that the shape of the outer container 12 is preferably either cylindrical or frusto-conical, although it is understood that the shape of the outer container 12 may also be rectangular or pyramidal. The generally tubular shape of the outer container 12 is closed at one end by a bottom and is opened at its upper end as viewed in FIG. 3. Around its periphery on the exterior of the outer container 12, an exterior nesting stop 22 is provided. The exterior nesting stop 22 is provided with a scalloped or irregular shape so that it varies upward and downward relative to the longitudinal axis of the outer container 12. Above the exterior nesting stop 22, an interior nesting stop 24 is provided on the interior of the outer container 12, with the interior nesting stop 24 being of a linear configuration. At the top of the inner container 12, at the end thereof opposite from its bottom, an outturned rim 26 is provided encircling the open end of the outer container 12.

The inner container 14 is also formed of a generally tubular shape and is constructed so as to generally conform to the shape of the outer container 12. The inner container 14 is also provided with a bottom at one end thereof and is opened at its other end, and is provided with an exterior nesting stop 28 provided about its circumference adjacent its open end. The exterior nesting stop 28 of the inner container 14 is also formed in a scalloped or irregular configuration so as to vary in position along a direction parallel to the longitudinal axis of the inner container 14. Just inside of the open end of the inner container 14, an interior nesting stop 30, of a linear circumferential shape is formed. An outturned lip 32 is provided about the open end of the inner container 14. Along its bottom surface, the inner container 14 is provided with a plurality of narrow slit openings 34. The slits 34 are sized so as to be slightly smaller in width than the smallest seed to be sprouted in the apparatus 10.

The cup-shaped dome member 16 is a shallow, frusto-conically shaped member having a predetermined interior volume. The interior volume of the dome member 16 is preferably selected so as to correspond to a predetermined amount of seeds, preferably having a volume of one cup dry measure. The interior of the dome member 18 may also be provided with graduated volume markings on its interior so that lesser amounts of seeds can be measured out or apportioned. The dome member 16 has a bottom formed at one end thereof, with the bottom being provided with a plurality of narrow slit openings 36. The slits 36 are also sized to be just slightly narrower in width than the smallest seeds to be sprouted in the sprouter. An outturned rim 38 is provided at the open end of the dome member 16, with the rim 38 being sized and formed so as to cooperate with the inner nesting stop 30 of the inner container 14 as can be seen in FIG. 3.

The cover 18 is a disc-shaped member designed to fit over the outturned lip 32 around the open end of the outer container 12. The cover 18 may carry suitable merchandising indicia on the outside face thereof and could also contain instructions for operating the sprouting apparatus 10 on the inside face thereof. Alternatively, the cover 18 could be formed of transparent material and a paperboard disc or discs could be provided underneath the cover 18 to carry this merchandising information and the instructions.

In its operation, the sprouting apparatus 10 of the present invention functions as both a merchandising package in which seeds may be sold so as to be sprouted at home by the consumer, and also as a sprouting apparatus in which the seeds themselves may be sprouted. In addition, the sprouting apparatus 10 also functions as a storage receptacle for the sprouted seeds so that they may be maintained in edible condition by the consumer at home for longer periods of time.

The sprouting apparatus 10 is intended to be purchased by the consumer in its configuration as seen in FIGS. 1 and 2. In that configuration, the sprouting apparatus 10 forms a unitary package with the outer container 12 receiving therein all the other components of the sprouting apparatus 10 and with the open end of the outer container 12 being sealed by the cover 18. Within the sprouting apparatus 10 as it is merchandised, a suitable supply of seeds 20 is provided. If desired, the seeds 20 may be packaged in a disposable flexible packaging, as is illustrated in FIG. 2, in which case the seeds may be received within the inner container 14. Alternatively, the seeds 20 may be positioned loosely inside the dome member 16 with the dome member 16 itself serving as a dry measure of the amount of seeds contained within the sprouting apparatus 10. The sprouting apparatus 10 thus functions as both a merchandising package and a complete and self-contained kit for manufacturing the sprouts.

Once the consumer has purchased the sprouting apparatus 10 and brought it home with a suitable amount of seeds, either contained therein or purchased separately, the sprouting apparatus 10 functions as an efficient and convenient apparatus in which to sprout the seeds. To sprout the seeds within the sprouting apparatus 10, the inner container 14 is inserted within the outer container 12 as shown in FIG. 3. When the inner container 14 is inserted within the outer container 12, the exterior nesting stop 28 on the inner container 14 rests on the interior nesting stop 24 on the outer container 12. When the inner container 14 is nested within the outer container 12 in this manner, the bottom of the interior container 14 is positioned spaced above the bottom of the outer container 12. After this is done, the seeds to be sprouted may be placed on the bottom of the inner container 14. The desired amount of seeds may be measured using the dome member 16 as the measuring device. After the seeds are placed in the bottom of the inner container 14, water can be poured into the inner container 14 to a level covering the seeds in the bottom thereof. After the seeds have had an opportunity to soak in a suitable amount of moisture, the inner container 14 can be lifted from the outer container 12 with the seeds remaining in the inner container 14 and the water draining into the outer container 12, from which it may be poured off. The inner container 14 is then placed back in the outer container 12 and the dome member 16 is then inverted and placed inside the top of the inner container 14 as can be seen in FIG. 3. The outturned rim 38 on the open end of the dome member 16 seals into the interior nesting stop 30 provided about the open end of the inner container 14 so as to cover the top of the sprouting apparatus 10 in its sprouting configuration.

The sprouting apparatus 10 in its sprouting configuration, as shown in FIG. 3, functions as an optimal sprouting environment for the seeds therein. The high moisture environment is maintained within the sprouting apparatus 10 from the moisture left behind by the periodic rinsing of the seeds. Rinsing of the seeds is facilitated by provision for the inner container 14 from which water freely drains into the outer container 12. The residual moisture remaining after each rinsing of the seeds slowly drips down from the seeds in the inner container 14 through the slits 34 provided on the bottom of the inner container 14 to rest on the inside of the bottom of the outer container 12. This reservoir of water lying in the bottom of the outer container 12 ensures that all the air within the sprouting apparatus 10 remains at a relatively high humidity. In addition, fresh air is provided for the sprouts, such as they need it, by means of the slits 36 provided in the bottom of the inverted dome member 16.

As an additional safeguard against unwarranted souring or spoiling of the seeds, the scalloped configuration of the exterior nesting stop 28 on the exterior of the inner container 14 functions as an air gap to allow air to pass between the inner container 14 and the outer container 12 so that air is not trapped above the reservoir of water lying in the bottom of the outer container 12. As can be seen in FIG. 3, this scalloped edge of the exterior nesting stop 28 ensures that gaps are maintained between the exterior nesting stop 28 and the interior nesting stop 24 of the outer container 12 at all times so that air passes freely therebetween. In addition, the double wall configuration of the inner container 14 and the outer container 12 ensures that a double layer of insulation is provided around the exterior of the sprouts growing within the inner container 12 so that a more beneficial temperature environment for the growing of the sprouts is maintained at all times.

In addition to an apparatus for merchandising and sprouting the sprouts themselves, the apparatus 10 of the present invention is also a highly suitable apparatus for storage of the sprouted seeds. Because of the insulating characteristics of the double wall container provided by the inner and outer containers 14 and 12, the sprouts received within the inner container 14 remain viable for a longer period of time than in prior art devices. In addition, mold growth is inhibited in the sprouts contained within the inner container 14 because the excess moisture therein is encouraged to drip down through the slits 34 in the bottom of the inner container 14 and fresh air is allowed to pass to the sprouts through the slits 36 provided in the dome member 16.

It is envisioned that the sprouting apparatus of the present invention may be constructed of any size, color, or material as may be desired for the particular application. The present apparatus is particularly well adapted, however, to construction of light-weight disposable plastic materials so that the sprouting apparatus 10 of the present invention can be sold at a nominal cost with the seeds to be sprouted in the apparatus, and with the sprouting apparatus 10 being either reusable or disposable at the option of the consumer. The sprouting apparatus 10 according to the present invention is also particularly adapted for use by an unskilled person in the art of sprouting or someone unfamiliar with the general field of sprouting seeds for human consumption, because of the self-contained nature of the sprouting kit formed by the complete apparatus 10. It is envisioned that any number of disc-shaped cards containing thereon printed instructional or promotional material may be inserted inside of the cover 18 in the sprouting apparatus 10 as it is sold. Such cards may carry informational materials about the operation of the sprouting apparatus 10, or may contain recipes or other promotional materials about the use of sprouts or the art of sprouting in general.

Figure 4:
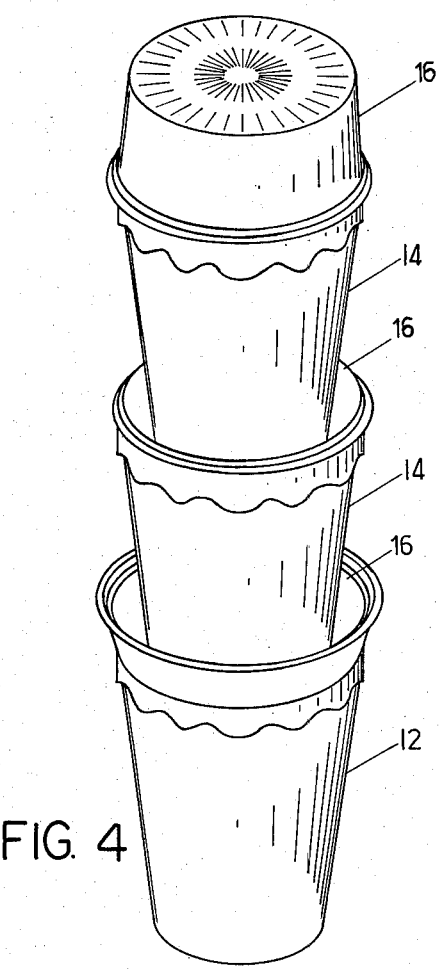
FIG. 4 is an illustration of the stacking technique which may be used with the sprouting apparatus according to the present invention when it is desired to sprout multiple kinds of seeds at one time.

On occasion it is desired to sprout multiple kinds of seeds simultaneously for a recipe for which more than one kind of seed is desired. Thus, several units of the sprouting apparatus of the present invention may be utilized together to sprout a number of different seeds in the manner as illustrated in FIG. 4. A dome member 16 is inserted with its open end up into the interior of an outer container 12 and an inner container 14 is set inside of the dome member 16. Another dome member 16 may then be inserted inside the open end of the inner container 14 and another inner container 14 inserted thereupon. The inner containers 14 and the dome members 16 may be stacked in this fashion until the top of the assembled unit is covered by an inverted dome member 16. When the apparatus is assembled in this fashion, water poured into the top of the inner container 14 will slowly trickle down through all of the inner containers 14 positioned underneath it so that all the sprouts therein are suitably watered so as to encourage the growth and development of all the sprouts simultaneously.

It is understood that the present invention is not limited to the particular construction and arrangement of parts illustrated and disclosed herein, but embraces all such modified forms thereof as come within the scope of the following claims.

I claim:

1. An apparatus for sprouting seeds comprising:
    an outer container (12) of a generally tubular shape provided with an interior nesting stop (24) and also provided with a bottom at one end thereof;
    an inner container (14) of a generally tubular shape provided with an interior (30) and an exterior (28) nesting stop and also provided with a bottom at one end thereof, the bottom of the inner container (14) being perforated with a plurality of openings (34), the inner container (14) being received within the outer container (12) with the exterior nesting stop (28) of the inner container (14) engaging the interior nesting stop (24) of the outer container (12) so that the bottom of the inner container (14) is spaced above the bottom of the outer container (12) so that water may drain from the inner container (14) to the outer container (12);
    a cup-shaped dome member (16) provided with a rim (38) around the edge thereof and arranged so as to be positioned over the other end of the inner container (14) with the rim (38) engaging the interior nesting stop (30) of the inner container (14) to form an enclosure in the inner container (14) suitable for the sprouting of seeds; and
    the exterior nesting stop (28) on the inner container provided with a shape so as to allow air flow between the inner and outer containers (14, 12).

2. An apparatus for sprouting seeds as claimed in claim 1 wherein the exterior nesting stop (28) is provided with a scalloped shape.

3. An apparatus as claimed in claim 1 wherein a plurality of slits are formed in the bottom of the dome member (16) so that air may circulate therethrough into the interior of the inner container (14).

4. An apparatus for sprouting seeds as claimed in claim 1 wherein the open end of the outer container (12) is provided with an outturned rim (26) and wherein there is further provided a cover (18) designed to fit over the open end of the outer container (12) and fit over the rim (26) thereof so as to seal the open end thereof so that the sprouting apparatus may be suitably merchandised in a retail environment as an enclosed package with such additional material included therein as may be desired.

5. An apparatus for sprouting seeds as claimed in claim 1 wherein the openings (34) in the bottom of the inner container (14) are slits (34) sized so as to be slightly narrower in width than the size of the seeds to be sprouted in the apparatus, and wherein the bottom of the inner container (14) is shaped to slope downwardly toward the periphery thereof.

6. An apparatus for sprouting seeds as claimed in claim 1 wherein the dome member is sized so as to have a volume of one cup, dry measure.

7. A kit for cultivating sprouts from seeds comprising:

an outer container (12) of a generally tubular shape provided with an interior nesting stop (24) and also provided with a bottom at one end thereof;

an inner container (14) of a generally tubular shape provided with an exterior nesting stop (28) and with a bottom at one end thereof and received within the outer container (12), the bottom of the inner container (14) being perforated with a plurality of slits (34);

a cup-shaped dome member (16) received in the inner container (14) and adapted to fit into the open end of the inner container (14) in either of an inverted or upright position;

a supply of seeds (20) received in one of the dome members (16) and the inner container (14);

a cover (18) adapted to fit over the open end of the outer container (12) to close the open end thereof to hold the inner container (14), the dome member (16) and the supply of seeds (20) in the outer container (12); and the exterior nesting stop (28) on the inner container (14) shaped so that when it engages the interior nesting stop (24) on the outer container (12) an air passage is maintained between the inner and outer containers.

8. A kit for cultivating sprouts from seeds as claimed in claim 7 wherein an interior nesting stop (30) is provided in the interior of the inner container (14) and wherein an outturned rim (38) is formed about the open end of the dome member (16), the rim (38) of the dome member (16) engaging the interior nesting stop (30) of the inner container (14) whether the dome member is upright or inverted.

* * * * *